US010451131B2

United States Patent
Nakasone

(10) Patent No.: US 10,451,131 B2
(45) Date of Patent: Oct. 22, 2019

(54) SHOCK-ABSORBING DEVICE

(71) Applicant: PIOLAX, INC., Yokohama-shi (JP)

(72) Inventor: Hisashi Nakasone, Yokohama (JP)

(73) Assignee: PIOLAX, INC., Yokohama-Shi, Kanagawa (JP)

( * ) Notice: Subject to any disclaimer, the term of this patent is extended or adjusted under 35 U.S.C. 154(b) by 0 days.

(21) Appl. No.: 15/572,708

(22) PCT Filed: May 11, 2016

(86) PCT No.: PCT/JP2016/064005
§ 371 (c)(1),
(2) Date: Nov. 8, 2017

(87) PCT Pub. No.: WO2016/181994
PCT Pub. Date: Nov. 17, 2016

(65) Prior Publication Data
US 2018/0106322 A1  Apr. 19, 2018

(30) Foreign Application Priority Data
May 13, 2015 (JP) ................................. 2015-098180

(51) Int. Cl.
*E05F 5/02* (2006.01)
*F16F 1/12* (2006.01)
*B60R 7/06* (2006.01)

(52) U.S. Cl.
CPC .................. *F16F 1/12* (2013.01); *B60R 7/06* (2013.01); *F16F 1/128* (2013.01)

(58) Field of Classification Search
CPC ...... E05Y 2900/538; E05F 5/022; E05F 5/08; E05F 5/02; E05F 5/025; E05F 5/06;
(Continued)

(56) References Cited

U.S. PATENT DOCUMENTS 2,500,416 A * 3/1950 Kaminski ............... E05C 17/48
292/288
3,772,736 A * 11/1973 Hettich ............... E05D 11/1021
16/288
(Continued)

FOREIGN PATENT DOCUMENTS

CN    203770315 U    8/2014
CN    104100615 A    10/2014
(Continued)

OTHER PUBLICATIONS

Chinese Office Action, dated Jan. 2, 2019, in Chinese Application No. 201680027624.X and English Translation thereof.
(Continued)

*Primary Examiner* — Bradley T King
*Assistant Examiner* — Stephen M Bowes
(74) *Attorney, Agent, or Firm* — McGinn I.P. Law Group, PLLC.

(57) ABSTRACT

There is provided a shock-absorbing device disposed between a fixed member and a movable member to suppress movement of the movable member. The shock-absorbing device includes a case member; a shock-absorbing member; and a spring. The case member has a bottom portion, a supporting portion, a shaft portion, and a circumferential wall. The shock-absorbing member has an inner cylinder into which the shaft portion is inserted, an outer cylinder, and a spring bearing portion. A retaining member is provided between the case member and the shock-absorbing member. An outer circumference of the outer cylinder is disposed in an inner circumference of the circumferential wall to function as a first guide for the shock-absorbing member, and an inner circumference of the inner cylinder is disposed on an outer circumference of the shaft portion to function as a second guide for the shock-absorbing member.

6 Claims, 10 Drawing Sheets

(58) Field of Classification Search
CPC .. F16F 2236/04; F16F 2236/045; F16F 9/003; F16F 9/32; F16F 9/3207; F16F 9/3235; F16F 9/3242; F16F 13/005; A47B 88/473; A47B 88/477; Y10T 16/61; Y10T 16/625

See application file for complete search history.

(56) References Cited

U.S. PATENT DOCUMENTS

| | | | |
|---|---|---|---|
| 6,367,123 B1* | 4/2002 | Cheal | E05D 3/145 16/289 |
| 6,397,434 B1 | 6/2002 | Cheal et al. | |
| 2003/0141638 A1* | 7/2003 | Salice | E05F 1/16 267/34 |
| 2006/0101615 A1* | 5/2006 | Pinzl | E05F 5/022 16/82 |
| 2008/0021577 A1 | 1/2008 | Ijichi et al. | |
| 2014/0298638 A1 | 10/2014 | Colombo et al. | |

FOREIGN PATENT DOCUMENTS

| | | | |
|---|---|---|---|
| DE | 102009013074 A1 * | 9/2010 | ............. E05F 5/022 |
| EP | 1 148 196 A2 | 10/2001 | |
| JP | S 48-033499 Y1 | 10/1973 | |
| JP | 2001-355373 A | 12/2001 | |
| JP | 2008-143250 A | 6/2008 | |
| JP | 2009-021001 A | 1/2009 | |
| JP | 2009-210001 A | 9/2009 | |
| JP | 2010-228675 A | 10/2010 | |
| JP | 4903171 B2 | 3/2012 | |

OTHER PUBLICATIONS

International Search Report (ISR) (PCT Form PCT/ISA/210), in PCT/JP2016/064005, dated Jun. 7, 2016.
(PCT Form PCT/ISA/237), in PCT/JP2016/064005, dated Jun. 7, 2016.

* cited by examiner

SHOCK-ABSORBING DEVICE

TECHNICAL FIELD

The present invention relates to a shock-absorbing device for mitigating, for example, impact generated when a lid of a glove box or the like is closed.

BACKGROUND ART

For example, in an openable/closable system of a vehicle, a shock-absorbing device is provided for mitigating impact generated when a lid of a glove box placed within the vehicle is closed or when a door of the vehicle is closed or suppressing the vibration of the lid or the door which is in a closed state.

As a shock-absorbing device like the one described above, Patent Document 1 below describes a shock-absorbing part including a casing, a rubber load bearing member which is mounted slidably on the casing, and a spring for biasing in a moving-away direction from a bottom portion of the load bearing member. The casing has an anchor strut portion which is erected from a bottom portion and a circumferential edge thereof. Additionally, the load bearing member is disposed within the anchor strut portion, so that an outer circumference of the load bearing member is brought into sliding contact with an inner circumference of the anchor strut portion. Further, a shaft portion projects from the bottom portion of the casing, and the spring is supported on an outer circumference of the shaft portion. A proximal end side of the load bearing member has a cylindrical shape, and the spring is inserted and an upper end portion of the shaft portion is disposed in an inner circumference of the proximal end side of the load bearing member.

PRIOR ART DOCUMENT

Patent Document

Patent Document 1: JP-A-2009-21001

SUMMARY OF INVENTION

Problems to be Solved by Invention

In Patent Document 1 above, the spring is inserted in the inner circumference of the load bearing member, and the shaft portion of the casing is disposed within the spring. However, since the spring contracts when a load is borne by the load bearing member, the spring and the shaft portion which stays inside the spring do not function as a guide for the load bearing member when it slides. Due to this, the load bearing member is guided only by the anchor strut portion of the casing when it slides. When bearing a load, the load bearing member tends to tilt, and hence, there occurs a situation from time to time where the load bearing member is not guided stably. In order to deal with this without changing an axial length of the casing, it is considered, for example, that an axial length of the load bearing member is extended. However, in this case, the load bearing member tends to strike the bottom portion of the casing, and the sliding amount of the load bearing member is reduced, whereby the shock-absorbing performance thereof is reduced.

Consequently, an object of the invention is to provide a shock-absorbing device which can improve its guiding property while ensuring a sliding amount of a shock-absorbing member.

Means for Solving Problems

In order to achieve the object described above, according to the invention, there is provided a shock-absorbing device disposed between a fixed member and a movable member which is configured to move towards and away from the fixed member and the shock-absorbing device configured to suppress movement of the movable member, including a case member, a shock-absorbing member mounted slidably on the case member and configured to be brought into abutment with the movable member or the fixed member to bear impact, and a spring configured to bias the shock-absorbing member in a direction away from the case member, wherein the case member has a bottom portion, a supporting portion which supports one end of the spring, a shaft portion which projects from the bottom portion, and a circumferential wall disposed on an outer circumference of the shaft portion to receive the shock-absorbing member, wherein the shock-absorbing member has an inner cylinder into which the shaft portion of the case member is inserted, an outer cylinder disposed on an outer circumference of the inner cylinder, and a spring bearing portion configured to support the other end of the spring, wherein retaining means for preventing the shock-absorbing member from being detached from the case member is provided between the case member and the shock-absorbing member, and wherein an outer circumference of the outer cylinder of the shock-absorbing member is disposed in an inner circumference of the circumferential wall of the case member to function as a first guide for the shock-absorbing member when the shock-absorbing member slides, and an inner circumference of the inner cylinder of the shock-absorbing member is disposed on an outer circumference of the shaft portion of the case member to function as a second guide for the shock-absorbing member when the shock-absorbing member slides.

In the shock-absorbing device, it is preferable that the first guide and the second guide are disposed in positions where the first guide and the second guide overlap with each other in an axial direction when the case member is seen in a cross section taken along the axial direction.

In the shock-absorbing device, it is preferable that a cylindrical space is defined between the inner cylinder and the outer cylinder of the shock-absorbing member and that the cylindrical space is disposed axially outwards of the case member in such a state that the shock-absorbing member slides in a direction away from the supporting portion of the case member while the retaining means prevents the shock-absorbing member from being detached from the case member, and an axially outer end portion of the cylindrical space constitutes the spring bearing portion.

In the shock-absorbing device, it is preferable that the retaining means is made up of a diametrically enlarged portion which is provided at a distal end portion of the shaft portion of the case member by diametrically enlarging the distal end portion and an engaging claw which is formed at a proximal end portion side of the inner cylinder of the shock-absorbing member so as to be deflected via a slit and is configured to be brought into engagement with the diametrically enlarged portion.

In the shock-absorbing device, it is preferable that the shock-absorbing member has a main body having the inner cylinder and the outer cylinder and a cap formed of an elastic member and configured to be mounted on an outer circumference of a distal end portion of the main body, that a projecting portion is provided so as to project from an inner surface side of the cap into the inner cylinder, and that the projecting portion of the cap is configured to be brought into abutment with the distal end portion of the shaft portion of the case member before the shock-absorbing member is pushed to slide against an elastic biasing force of the spring and the shock-absorbing member is brought into abutment with the bottom portion of the case member.

Advantageous Effects of Invention

According to the invention, since the shock-absorbing member slides while contracting the spring when the movable member moves towards the fixed member to push the shock-absorbing device, the impact exerted by the movable member or the vibration of the movable member can be absorbed due to the elastic biasing force of the spring. As this occurs, the outer circumference of the outer cylinder of the shock-absorbing member is disposed in the inner circumference of the circumferential wall of the case member to constitute the first guide for the shock-absorbing member when the shock-absorbing member slides, and the inner circumference of the inner cylinder of the shock-absorbing member is disposed on the outer circumference of the shaft portion of the case member to constitute the second guide for the shock-absorbing member when the shock-absorbing member slides. Thus, since the shock-absorbing member is guided by the two guides, the shock-absorbing member can be guided firmly while ensuring the sliding amount of the shock-absorbing member.

BRIEF DESCRIPTION OF DRAWINGS

FIGS. 5A and 5B show a state in which the shock-absorbing device according to the invention is mounted on a fixed member, in which FIG. 5A is a front view of the shock-absorbing device, and FIG. 5B is a sectional view taken along a line indicated by arrows A in FIG. 5A.

FIGS. 6A and 6B show a state in which the shock-absorbing device according to the invention is mounted on the fixed member, in which FIG. 6A is a side view of the shock-absorbing device, and FIG. 6B is a sectional view taken along a line indicated by arrows B in FIG. 6B.

FIG. 7 shows a state in which the shock-absorbing device according to the invention is in used, wherein FIG. 7 is a sectional view of a state in which the shock-absorbing member is pushed by a movable member from the state shown in FIG. 6B.

FIGS. 8A and 8B show another embodiment of a shock-absorbing device according to the invention, in which FIG. 8A is a side view of a state in which the shock-absorbing device is mounted on a fixed member, and FIG. 8B is a sectional view taken along a line C-C in FIG. 8A.

FIGS. 9A and 9B show a further embodiment of a shock-absorbing device according to the invention, in which FIG. 9A is a side view of a state in which the shock-absorbing device is mounted on a fixed member, and FIG. 9B is a sectional view taken along a line D-D in FIG. 9A.

FIGS. 11A and 11B show a state in which the shock-absorbing device according to the invention is in used, wherein FIG. 11A is a sectional view showing a state in which a shock-absorbing member is pushed by a movable member from the state shown in FIG. 10, and FIG. 11B is a sectional view of a state in which the shock-absorbing member is pushed further from the state shown in FIG. 11A.

EMBODIMENTS OF INVENTION

Hereinafter, referring to FIGS. 1 to 7, an embodiment of a shock-absorbing device according to the invention will be described.

As shown in FIGS. 1, 5A, 5B and 7, a shock-absorbing device 10 of this embodiment is disposed between a fixed member 1 and a movable member 5 which moves towards and away from the fixed member 1 so that the movable member 5 is brought into abutment with the shock-absorbing device 10 which then suppresses the movement of the movable member 5. For example, a glove box of a vehicle, a vehicle frame, a vehicle panel and the like are raised as the fixed member 1, while a lid which is opened and closed relative to an opening portion of a glove box and various doors (a side door, a tailgate or transverse rear door, and the like) are raised as the movable member 5. However, there is no specific limitation on the fixed member 1 and the movable member 5. A mounting hole 3 taking the form of a circular hole is formed in the fixed member 1 (refer to FIG. 1).

Figure 1:
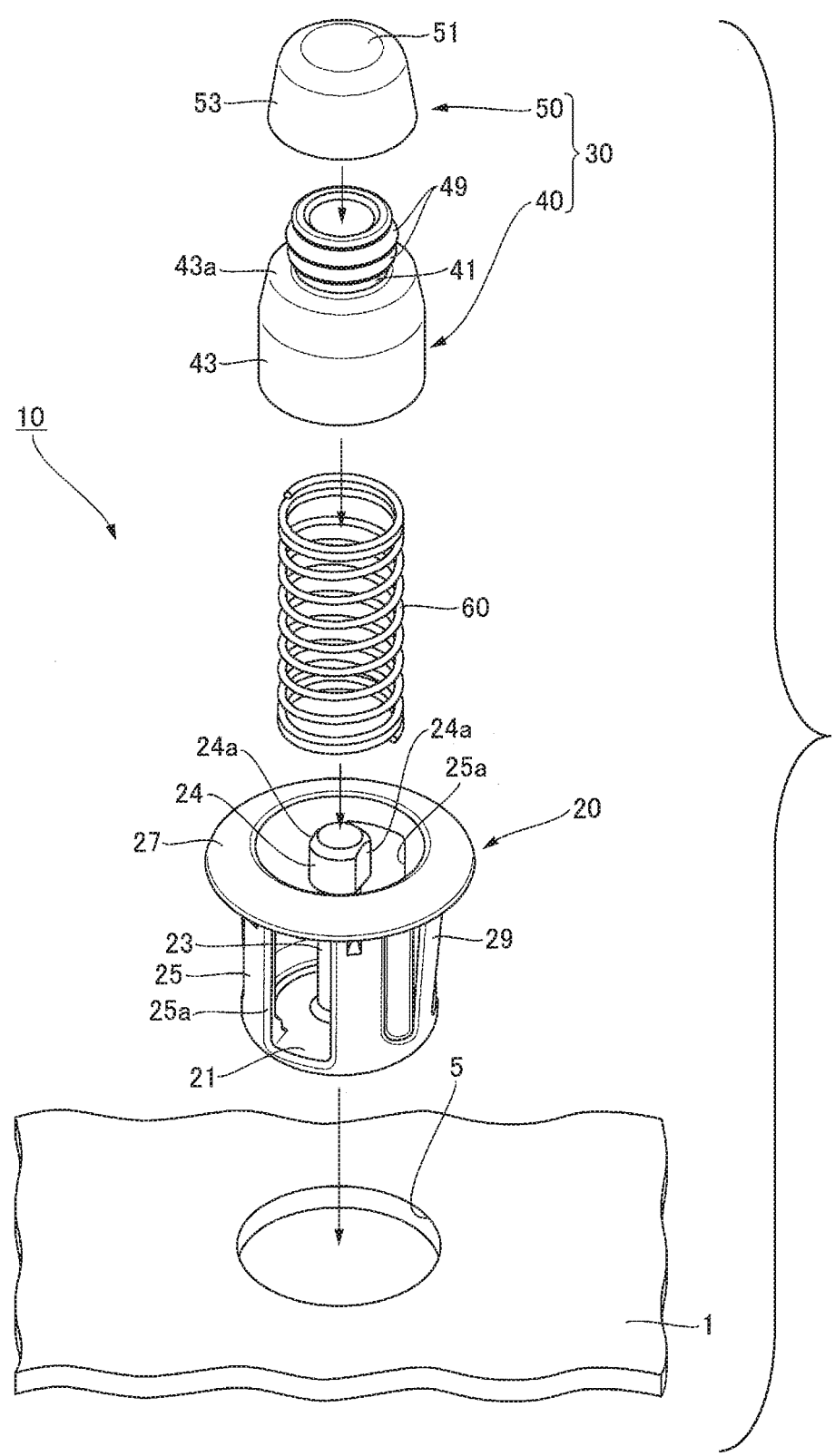
FIG. 1 is an exploded perspective view showing an embodiment of a shock-absorbing device according to the invention.

As shown in FIG. 1, the shock-absorbing device 10 of this embodiment includes a case member 20 which is mounted on the fixed member 1, a shock-absorbing member 30 which is mounted slidably on the case member 20 and which is brought into abutment with the movable member 5 to receive impact exerted by the movable member 5, and a spring 60 configured to bias the shock-absorbing member 30 in a direction away from the case member 20 (here, towards the movable member 5).

In this embodiment, the case member 20 is mounted in the mounting hole 3 in the fixed member 1, whereby the shock-absorbing device 10 is mounted on the fixed member 1. However, a mounting hole may be provided in the movable member 5 such as a lid or a door, so that the shock-absorbing device 10 is provided on the movable member 5, and hence, there is no specific limitation on where to provide the shock-absorbing device 10, as long as the shock-absorbing device 10 is provided between the fixed member and the movable member.

Figure 5A:
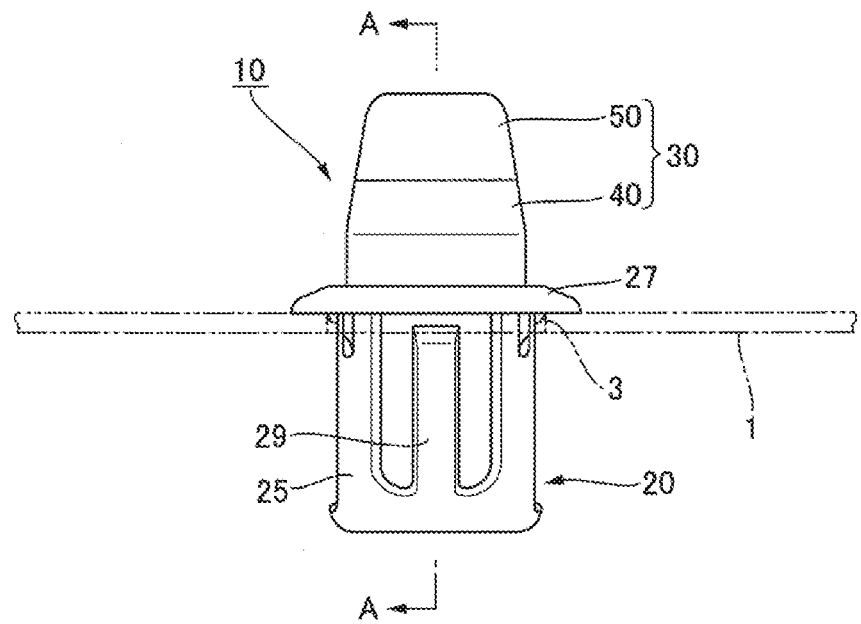
Figure 5B:
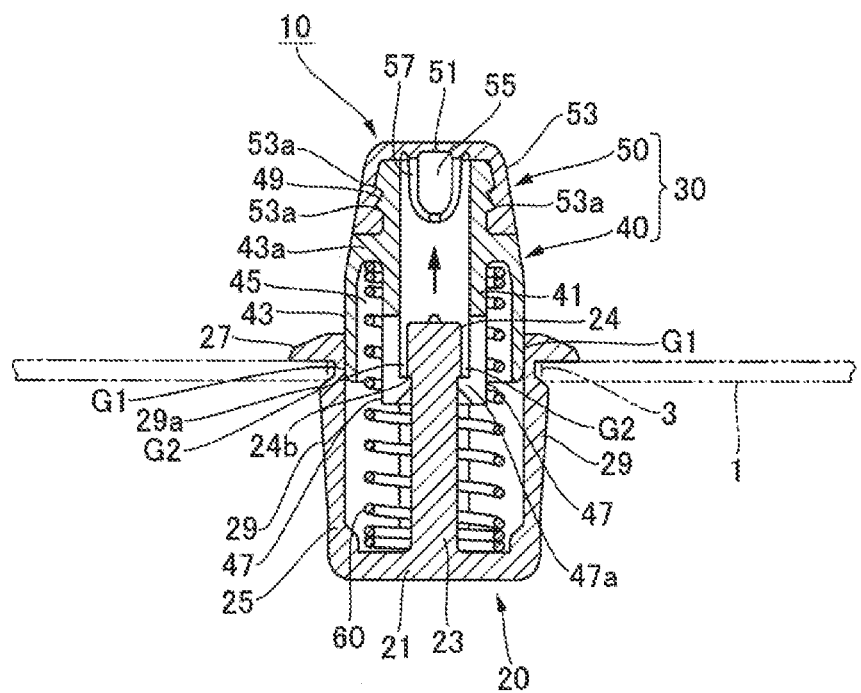
Figure 6A:
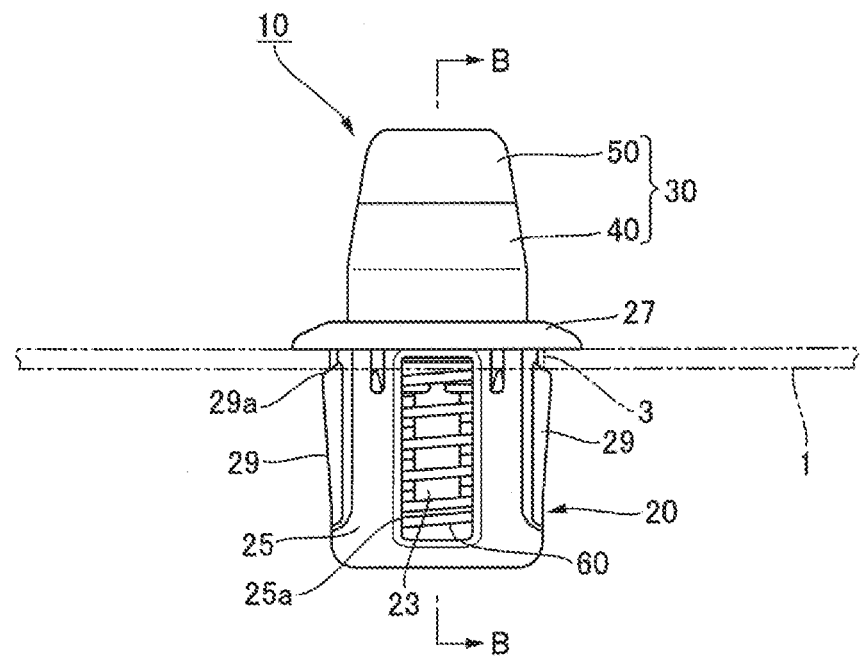
Figure 6B:
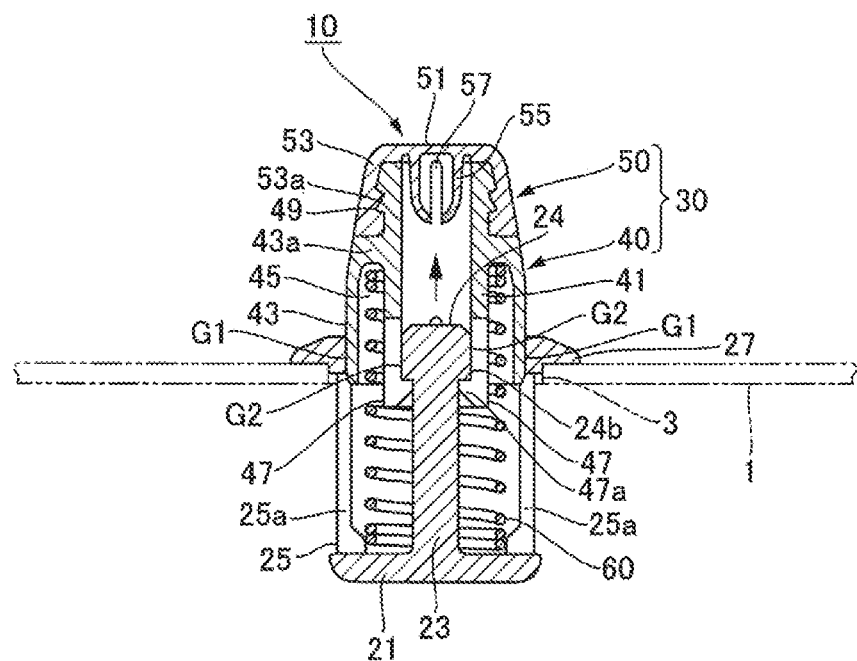

As shown in FIGS. 1, 5B and 6B, the case member 20 has a bottom portion 21, a supporting portion which supports one end of the spring 60, a shaft portion 23 which projects from the bottom portion 21 and a circumferential wall 25 which is disposed on an outer circumference of the shaft portion 23 to receive the shock-absorbing member 30 therein.

The case member 20 of this embodiment is formed substantially into the shape of a bottomed cylinder as a whole, and the bottom portion 21 has a substantially circular disc shape, the one end of the spring 60 being supported on the bottom portion 21. Namely, in this embodiment, the bottom portion 21 constitutes a "supporting portion" of the invention. A supporting portion for the spring 60 may be provided separately from the bottom portion 21 by providing, for example, annular projections or arc-shaped ribs at predetermined intervals on an inner circumference of the circumferential wall 25.

The shaft portion 23 projects to a predetermined height from an inner surface (a supporting surface for the spring 60) of the bottom portion 21, and the shaft portion 23 is inserted into an interior portion of the spring 60 (refer to FIG. 5B). Further, the substantially cylindrical circumferential wall 25 is erected in a predetermined length in the same direction as the projecting direction of the shaft portion 23 from a circumferential edge of the bottom portion 21 on the outer circumference of the shaft portion 23, and the shock-absorbing member 30 and the spring 60 are received in an inner circumference of the circumferential wall 25.

As shown in FIGS. 1 and 5B, a diametrically expanded portion 24, which takes the form of a substantially circular projecting portion and which is formed diametrically wider or thicker than other portions, is provided at an axially distal end portion (an end portion located farther away from the bottom portion 21) of the shaft portion 23. Flat surfaces 24a, 24a, which are parallel to each other, are formed in positions on the diametrically expanded portion 24 which face each other in a circumferential direction thereof (refer to FIG. 1). Additionally, as shown in FIGS. 5B and 6B, the axially distal end portion of the shaft portion 23 projects slightly longer than a distal end portion of the circumferential wall 25 in the erected direction thereof.

Cut-out portions 25a, 25a are formed in a predetermined length along an axial direction of the case member 20, that is, an axial direction of the shaft portion 23 at locations on the circumferential wall 25 which face each other in a circumferential direction thereof (refer to FIGS. 1 and 6B). An annular flange portion 27, which is configured to be brought into abutment with a front side circumferential edge of the mounting hole 3 in the fixed member 1, is provided so as to project radially outwards from an outer circumference of the distal end portion of the circumferential wall 25 in the erected direction thereof. Locking portions 29, 29, which are configured to lock on a rear side circumferential edge of the mounting hole 3 in the fixed member 1, are provided so as to project from positions on the circumferential wall 25 which are at right angles to the cut-out portions 25a, 25a in the circumferential direction (refer to FIGS. 5B and 6A). The locking portions 29 each have an apex portion 29a which projects high radially outwards of the circumferential wall 25 (refer to FIG. 5B), and a side of the locking portion 29 which extends from the apex portion 29a towards the bottom portion 21 is made into a tapered shape which is inclined diametrically moderately, whereas a side of the locking portion 29 which extends from the apex portion 29a towards the flange portion 27 is made into a tapered shape which is inclined diametrically steeply.

In this embodiment, as shown in FIG. 5B, a step portion 24b at a proximal end side of the diametrically expanded portion 24 of the shaft portion 23 is disposed between the apex portions 29a of the locking portions 29 which are provided on the outer circumference of the circumferential wall 25 so as to project therefrom and the flange portion 27.

In the case of this embodiment, the case member is substantially the bottomed cylinder. However, the case member may be a bottomed angular cylinder. Thus, there is no specific limitation on the shape of the case member, provided that the case member can be mounted on the fixed member or the movable member and is constructed so as to support the shock-absorbing member slidably.

Next, the shock-absorbing member 30 which is mounted slidably on the case member 20 will be described. The shock-absorbing member 30 is mounted on the case member 20 and slides in an axial direction of the case member 20 so as to move towards or away from the bottom portion 21 of the case member 20.

As shown in FIGS. 1, 5A and 6B, the shock-absorbing member 30 has an inner cylinder 41 into which the shaft portion 23 of the case member 20 is inserted, an outer cylinder 43 which is disposed on an outer circumference of the inner cylinder 41, and a spring bearing portion 43a configured to support the other end of the spring 60. Additionally, the shock-absorbing member 30 of this embodiment has a main body 40 having the inner cylinder 41 and the outer cylinder 43 and a cap 50 formed of an elastic material and configured to be mounted on an outer circumference of a distal end portion of the main body 40.

Firstly, the main body 40 will be described in detail. As shown in FIGS. 5B and 6B, the main body 40 has a double-cylinder configuration which has the substantially cylindrical inner cylinder 41 into which the shaft portion 23 of the case member 20 is inserted and the substantially cylindrical outer cylinder 43 which is disposed on the outer circumference of the inner cylinder 41 concentrically therewith, and a cylindrical space 45 is formed between the inner cylinder 41 and the outer cylinder 43 so that the other end of the spring 60 is inserted to be supported therein.

Figure 3:
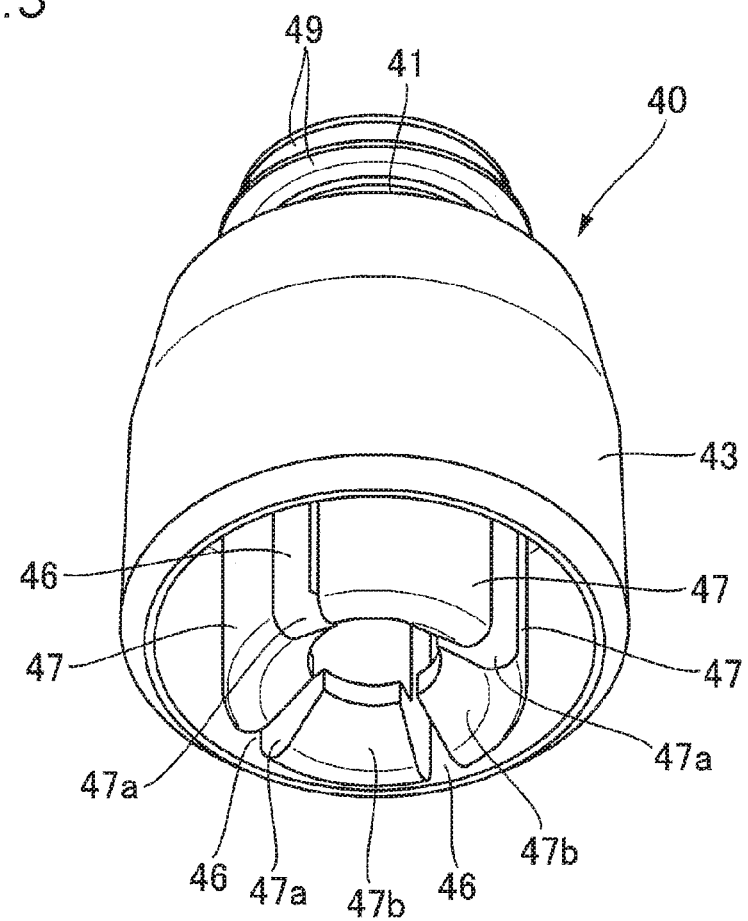
FIG. 3 is a perspective view of a main body which makes up the shock-absorbing member of the shock-absorbing device according to the invention.
Figure 4:
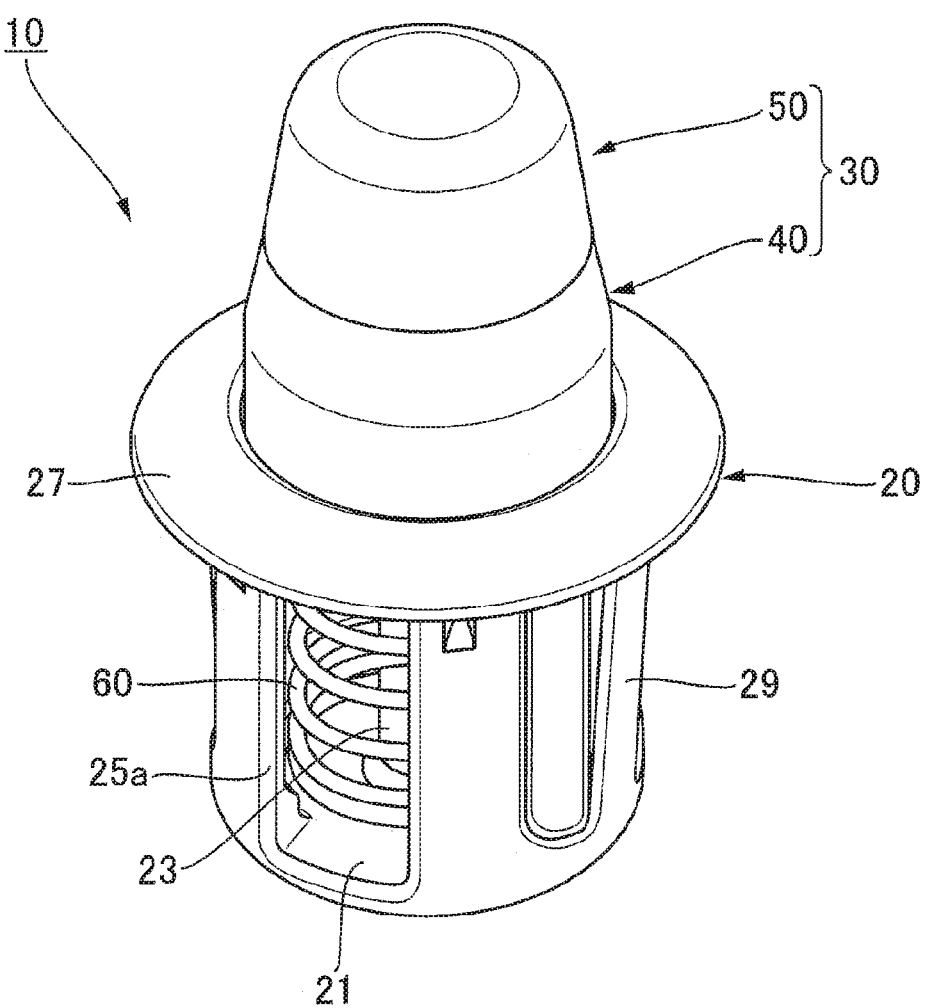
FIG. 4 is a perspective view of the shock-absorbing device according to the invention.

As shown in FIG. 1, a plurality of annular projecting portions 49 are provided on an outer circumference of an axially distal end portion side of the inner cylinder 41. Further, as shown in FIG. 3, a plurality of slits 46 extending along an axial direction of the inner cylinder 41 are formed in a circumferential direction in the axially proximal end portion side of the inner cylinder 41, and a plurality of engaging claws 47 (here, four engaging claws) are formed separately so as to be deflected via the plurality of slits 46. Each engaging claw 47 is formed so that a distal end portion 47a projects radially inwards of the inner cylinder 41. Additionally, an external surface (a surface at a side of the case member 20) of the distal end portion 47a of each engaging claw 47 is formed into a tapered surface 47b which gradually reduces a thickness of the distal end portion 47a as it extends radially inwards (refer to FIGS. 3 and 5B). The tapered surfaces 47b function as guides when the shaft portion 23 is inserted into the plurality of engaging claws 47.

On the other hand, as shown in FIGS. 1 and 5B, the annular spring bearing portion 43a is provided so as not only to project from an outer circumference of an axially halfway position on the inner cylinder 41 but also to extend concentrically with the inner cylinder 41 via the spring bearing portion 43a in a length which is slightly shorter than a length of the inner cylinder 41 including the engaging claws 47. Then, the cylindrical space 45 is defined between the outer cylinder 43 and the inner cylinder 41.

When the shock-absorbing member 30 is pushed in a direction towards the bottom portion 21 of the case member 20 with the other end of the spring 60 which is supported on the bottom portion 21 of the case member 20 at the one end thereof inserted in the cylindrical space 45, the other end of the spring 60 is brought into abutment with an axially outward end portion of the cylindrical space 45, that is, the spring bearing portion 43a to be supported thereon, and the plurality of engaging claws 47 of the inner cylinder 41 are brought into engagement with the diametrically expanded portion 24 of the shaft portion 23. Thus, the shock-absorbing member 30 is prevented from being detached from the case member 20 against a biasing force of the spring 60 (refer to FIGS. 5B and 6B). Namely, in this embodiment, the engaging claws 47 and the diametrically expanded portion 24 of the shaft portion 23 constitute a "retaining means" of the invention.

The retaining means is not limited to the construction described above, and there is imposed no specific limitation on locations where the retaining means is provided. Namely, any construction may be adopted, provided that the retaining means is provided between the case member and the shock-absorbing member and can prevent the shock-absorbing member from being detached from the case member. Other constructions of retaining means will be described later in embodiments illustrated in FIGS. 8A, 8B, 9A and 9B.

As shown in FIGS. 5B and 6B, in this shock-absorbing device 10, an outer circumference of the outer cylinder 43 of the shock-absorbing member 30 is disposed in an inner circumference of the circumferential wall 25 of the case member 20 so as to function as a first guide G1 when the shock-absorbing member 30 slides, and an inner circumference of the inner cylinder 41 of the shock-absorbing member 30 is disposed on an outer circumference of the shaft portion 23 of the case member 20 so as to function as a second guide G2 when the shock-absorbing member 30 slides.

In this embodiment, as shown in FIGS. 5B and 6B, an outside diameter of the outer cylinder 43 has a dimension which almost matches a bore diameter of the circumferential wall 25 of the case member 20, so that the outer circumference of the outer cylinder 43 is brought into sliding contact with the inner circumference of the circumferential wall 25 when the shock-absorbing member 30 slides in the direction towards or away from the bottom portion 21 of the case member 20, whereby the outer circumference of the outer cylinder 43 constitutes the first guide G1. Additionally, as shown in FIG. 6B, a bore diameter of the inner cylinder 41 has a dimension which almost matches an outside diameter of the diametrically expanded portion 24 of the shaft portion 23 of the case member 20, so that the inner circumference of the inner cylinder 41 is brought into sliding contact with the outer circumference of the shaft portion 23 of the case member 20 when the shock-absorbing member 30 slides in the direction towards or away from the bottom portion 21 of the case member 20, whereby the inner circumference of the inner cylinder 41 constitutes the second guide G2.

When referred to in this invention, the guide when the shock-absorbing member slides means that when the shock-absorbing member is inclined at a predetermined angle relative to an axis of the case member while the shock-absorbing member is sliding, the shock-absorbing member is brought into abutment with the inner circumference of the circumferential wall of the case member or the outer circumference of the shaft portion of the case member, whereby the shock-absorbing member is allowed to slide while being restricted from being inclined any further. Consequently, the outer circumference of the outer cylinder 43 does not have to be brought into sliding contact with the inner circumference of the circumferential wall 25, or the inner circumference of the inner cylinder 41 does not have to be brought into sliding contact with the outer circumference of the shaft portion 23 as has been described above, and hence, a predetermined gap may be formed between the inner circumference of the circumferential wall 25 and the outer circumference of the outer cylinder 43 or between the outer circumference of the shaft portion 23 and the inner circumference of the inner cylinder 41.

Further, in this embodiment, as shown in FIGS. 5B and 6B, when the case member 20 is seen in section taken along the axial direction thereof, the first guide G1 and the second guide G2 are disposed to be located in positions where the first guide G1 and the second guide G2 overlap in the axial direction.

In addition, as shown in FIGS. 5B and 6B, in such a state that the shock-absorbing member 30 slides in a direction away from the bottom portion 21 of the case member 20, so that the shock-absorbing member 30 is prevented from being detached from the case member 20 by the retaining means (here, the engaging claws 47 and the diametrically expanded portion 24 of the shaft portion 23), the cylindrical space 45 of the shock-absorbing member 30 is disposed axially outwards of the case member 20, and the axially outward end portion of the cylindrical space 45 constitutes a spring bearing portion 45a.

Figure 2:
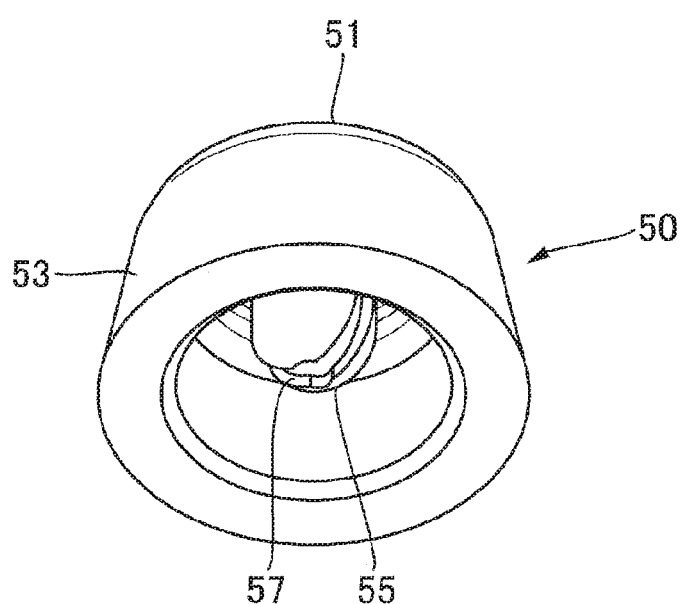
FIG. 2 is a perspective view of a cap which makes up a shock-absorbing member of the shock-absorbing device according to the invention.

On the other hand, as shown in FIGS. 2 and 5B, the cap 50 which is mounted on the main body 40 has a substantially disc-shaped abutment portion 51 which is formed of an elastic member of rubber or elastic elastomer and which is brought into abutment with the movable member 5 and a circumferential wall 53 which extends from a circumferential edge of the abutment portion 51 so as to be gradually increased in diameter. A plurality of annular recessed portions 53a are formed on an inner circumference of the circumferential wall 53, and the annular projecting portions 49 of the inner cylinder 41 are brought into engagement with these annular recessed portions 53a, whereby the cap 50 is mounted on the main body 40 (refer to FIGS. 5B and 6B).

Figure 7:
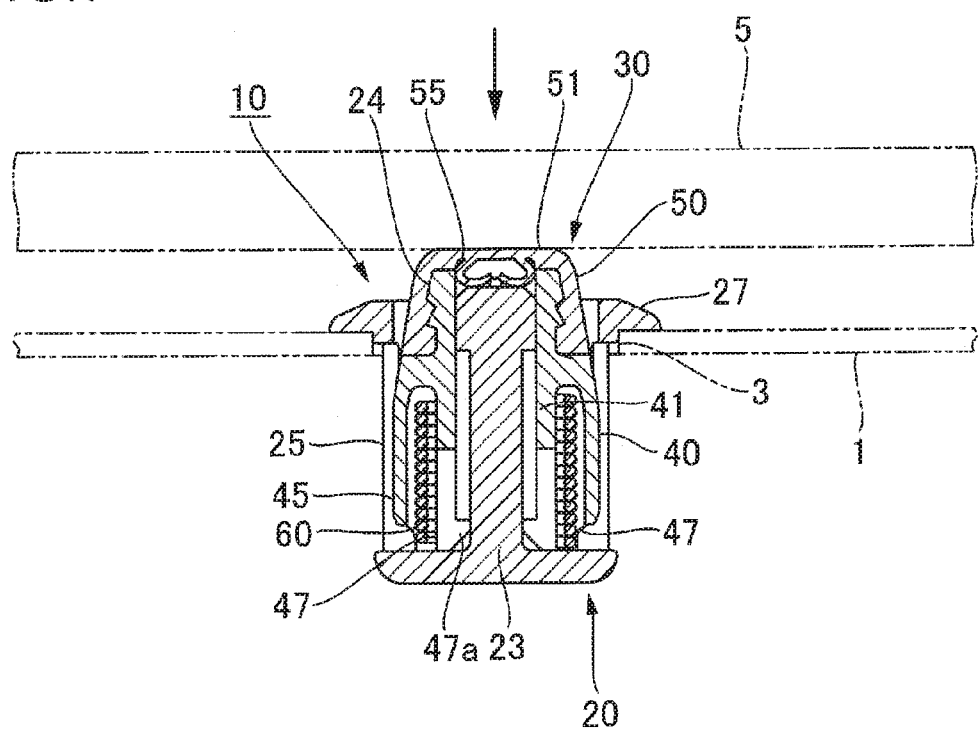

A projecting portion 55 is provided to project from an inner surface side (a side of the main body 40) of the abutment portion 51 of the cap 50 into the inner cylinder 41 of the main body 40, so that the projecting portion 55 is brought into elastic abutment with the diametrically expanded portion 24 at an axially distal end of the shaft portion 23 while being deformed in a deflectable fashion (refer to FIG. 7). As shown in FIG. 2, the projecting portion 55 of this embodiment is divided into a plurality of portions (here, divided into two portions) by a slit 57 which extends in an axial direction thereof, so that the projecting portion 55 is pushed to be collapsed when the shock-absorbing member 30 is pushed in so as to be brought into abutment with the diametrically expanded portion 24 of the shaft portion 23 (refer to FIG. 7).

In this embodiment, the shock-absorbing member 30 takes the two-part construction in which the shock-absorbing member 30 is made up of the main body 40 and the cap 50. However, the shock-absorbing member 30 may take a single-part construction which is formed of rubber or the like. Thus, there is imposed no specific limitation on the construction of the shock-absorbing member 30, provided that the shock-absorbing member 30 takes a construction in which the shock-absorbing member 30 has an inner cylinder, an outer cylinder and a cylindrical space and the other end of the spring 60 can be supported therein.

Next, a method for using the shock-absorbing device 10 and advantageous effects thereof will be described.

The shock-absorbing device 10 can be built up as follows, for example.

Firstly, the cap 50 is placed on an axially distal end side of the main body 40 of the shock-absorbing member 30, and the annular recessed portions 53a are brought into engagement with the annular projecting portions 49, whereby the cap 50 is mounted on the main body 40 with the projecting portion 55 disposed so as to project into the inner cylinder 41, and the shock-absorbing member 30 can be obtained.

Next, the spring 60 is accommodated to be disposed within the circumferential wall 25 of the case member 20. Then, the shaft portion 23 is inserted into the spring 60 and one end of the spring 60 is brought into abutment with the bottom portion 21 so as to be supported thereon. In this state, the other end of the spring 60 is left projecting in a predetermined length from an axially distal end side opening portion of the case member 20.

Then, the shaft portion 23 of the case member 20 is aligned with a radially inward center of the plurality of engaging claws 47 of the shock-absorbing member 30, and the other end of the spring 60 is aligned with the cylindrical space 45 of the shock-absorbing member 30 and is disposed therein, the shock-absorbing member 30 being pushed on to the case member 20. Then, the distal end portions 47a are pressed by the diametrically expanded portion 24 of the shaft portion 23, and the plurality of engaging claws 47 are expanded forcibly, whereby the diametrically expanded portion 24 of the shaft portion 23 is gradually inserted into the inner cylinder 41, and the other end of the spring 60 is inserted into the cylindrical space 45. Thereafter, when the distal end portions 47a of the engaging claws 47 ride over the diametrically expanded portion 24 of the shaft portion 23, the engaging claws 47 are elastically restored, whereby the distal end portions 47a are brought into engagement with the step portion 24b of the diametrically expanded portion 24 of the shaft portion 23 and the shaft portion 23 is inserted into the inner cylinder 41. Additionally, the other end of the spring 60 which is inserted into the cylindrical space 45 is brought into abutment with the spring bearing portion 43a which is located axially outwards of the cylindrical space 45 to be supported thereon. As a result of this, the spring 60 is interposed between the case member 20 and the shock-absorbing member 30 while being compressed, and the shock-absorbing member 30 can be mounted slidably on the case member 20 while being prevented from being detached from the case member (refer to FIGS. 5B and 6B). Additionally, in this state, the shock-absorbing member 30 is biased towards the movable member 5 by the spring 60, and the shock-absorbing member 30 has slid in the direction away from the bottom portion 21 of the case member 20 (refer to FIGS. 5B and 6B).

The case member 20 of the shock-absorbing device 10 built up in the way described above is inserted from a front side of the mounting hole 3 of the fixed member 1 and is then pushed in, whereby the flange portion 27 is brought into abutment with a circumferential edge on the front side of the mounting hole 3, and the locking portions 29 are locked on a circumferential edge on a rear side of the mounting hole 3, as shown in FIG. 5B and FIG. 6A. Thus, the shock-absorbing device 10 can be mounted in the fixed member 1.

In the state described above, as shown in FIG. 7, when the movable member 5 moves towards the fixed member 1 (for example, the movable member 5 moves in a direction in which a lid is closed towards an opening portion of the glove box), causing the movable member 5 to strike the abutment portion 51 of the cap 50 of the shock-absorbing member 30 to push the shock-absorbing member 30, the shock-absorbing member 30 slides towards the bottom portion 21 of the case member 20 while compressing the spring 60 against the biasing force of the spring 60, thereby making it possible to reduce the impact of the movable member 5 by absorbing it due to the elastic biasing force of the spring 60. In addition, even though the movable member 5 vibrates in such a state that the movable member 5 bears the elastic force of the spring 60 (for example, in such a state that the lid of the glove box is closed), the vibration can be reduced by absorbing it. As shown in FIG. 7, the projecting portion 55 of the cap 50 is elastically deformed as a result of the projecting portion 55 being brought into elastic abutment with the diametrically expanded portion 24 of the shaft portion 23.

Then, as shown in FIGS. 5B and 6B, in this shock-absorbing device 10, the outer circumference of the outer cylinder 43 of the shock-absorbing member 30 is disposed in the inner circumference of the circumferential wall 25 of the case member 20 to constitute the first guide G1 when the shock-absorbing member 30 slides, and the inner circumference of the inner cylinder 41 of the shock-absorbing member 30 is disposed on the outer circumference of the shaft portion 23 of the case member 20 to constitute the second guide G2 when the shock-absorbing member 30 slides. Therefore, the sliding of the shock-absorbing member 30 can be guided by the two guides G1, G2. As a result, it becomes difficult for the shock-absorbing member 30 to be inclined when the shock-absorbing member 30 slides towards or away from the bottom portion 21 of the case member 20, whereby the shock-absorbing member 30 is allowed to slide smoothly (refer to FIGS. 5B and 6B).

In this shock-absorbing device 10, the first guide G1 is provided on the outer circumference of the circumferential wall 25 of the case member 20 and the outer circumference of the outer cylinder 43 of the shock-absorbing member 30, and the second guide G2 is provided on the outer circumference of the shaft portion 23 of the case member 20 and in the inner circumference of the inner cylinder 41 of the shock-absorbing member 30. Therefore, the construction can be provided in which even though the shock-absorbing member 30 slides towards the bottom portion 21 of the case member 20, the shaft portion 23 of the shock-absorbing member 30 does not project from an external surface (an opposite surface to a spring supporting surface) of the bottom portion 21 of the case member 20, as a result of which an overall axial length of the shock-absorbing device 10 can be shortened, thereby making it possible to reduce the mounting space of the shock-absorbing device 10.

In this embodiment, as shown in FIGS. 5B and 6B, when the case member 20 is seen in section taken along the axial direction thereof, the first guide G1 and the second guide G2 are disposed so as to be located in the positions where the first guide G1 and the second guide G2 overlap each other in the axial direction, and therefore, the sliding of the shock-absorbing member 30 can be guided in positions on the inner and outer circumferences of the spring 60, whereby not only can the shock-absorbing device 10 be made shorter and more compact in the axial direction, but also a greater sliding amount of the shock-absorbing member 30 can be ensured.

In this embodiment, as shown in FIGS. 5B and 6B, in such a state that the shock-absorbing member 30 slides away from the bottom portion 21 of the case member 20 and the shock-absorbing member 30 is prevented from being detached from the case member 20 by the retaining means (here, the engaging claws 47 and the diametrically expanded portion 24 of the shaft portion 23), the cylindrical space 45 of the shock-absorbing member 30 is disposed axially outwards of the case member 20. Therefore, as described above, in building up the shock-absorbing device 10, it becomes easy to insert the other end of the spring 60 into the cylindrical space 45 of the shock-absorbing member 30 in such a state that the spring 60 is disposed on the shaft portion 23 of the case member 20 and one end of the spring 60 is supported on the bottom portion 21, thereby making it possible to improve the building-up property of the shock-absorbing device 10. Additionally, a sufficient length can be ensured for the spring 60, thereby making it possible to reduce the impact of the movable member 5 effectively.

In this embodiment, the retaining means is made up of the diametrically expanded portion 24 which is provided at the distal end portion of the shaft portion 23 of the case member 20 and the engaging claws 47 which can be deflected via the slits 46 at the proximal end portion side of the inner cylinder 41 of the shock-absorbing member 30. Due to this, the distal end portions 47a of the deflectable engaging claws 47 are brought into engagement with the step portion 24b of the diametrically expanded portion 24 of the shaft portion 23 by simple operations of aligning the shaft portion 23 of the case member 20 with the inner cylinder 41 of the shock-absorbing member 30 after the spring 60 is disposed in the case member 20 and pushing the shock-absorbing member 30 into the case member 20, whereby the shock-absorbing member 30 can be prevented from being detached from the case member 20 (refer to FIG. 6B), thereby making it possible to improve the building-up property of the shock-absorbing device 10. In addition, the retaining means is made up of the diametrically expanded portion 24 at a distal end of the shaft portion 30 and the engaging claws 47 provided at a distal end side of the inner cylinder 41, and the retaining structure is disposed on an inner diameter side of the spring 60 (refer to FIG. 6B). Therefore, the outside diameter of the spring 60 can be ensured relatively greatly, whereby the elastic biasing force of the spring 60 can easily be controlled.

In this embodiment, as shown in FIG. 7, when the shock-absorbing member 30 is pushed by the movable member 5 whereby the shock-absorbing member 30 slides towards the bottom portion 21 of the case member 20 against the biasing force of the spring 60, the projecting portion 55 of the cap 50 is brought into elastic abutment with the diametrically expanded portion 24 at the axially distal end of the shaft portion 23 so as to be elastically deformed in such a way as to expand by being collapsed forcibly via the slit 57 before the outer cylinder 43 of the shock-absorbing member 30 is brought into abutment with the bottom portion 21 of the case member 20. In FIG. 7, as a matter of convenience, a state is shown in which the shock-absorbing member 30 is pushed to a maximum extent by the movable member 5 whereby the proximal end portion of the inner cylinder 41 is in abutment with the bottom portion 21 of the case member 20. Then, in this embodiment, since the shock-absorbing member 30 is pushed by the movable member 5 whereby the projecting portion 55 of the cap 50 is brought into elastic abutment with the distal end of the shaft portion 23 before the shock-absorbing member 30 is brought into abutment with the bottom portion 21 of the case member 20 against the elastic biasing force of the spring 60, striking noise generated when the movable member 5 collides with the shock-absorbing member 30 can be reduced.

Figure 8A:
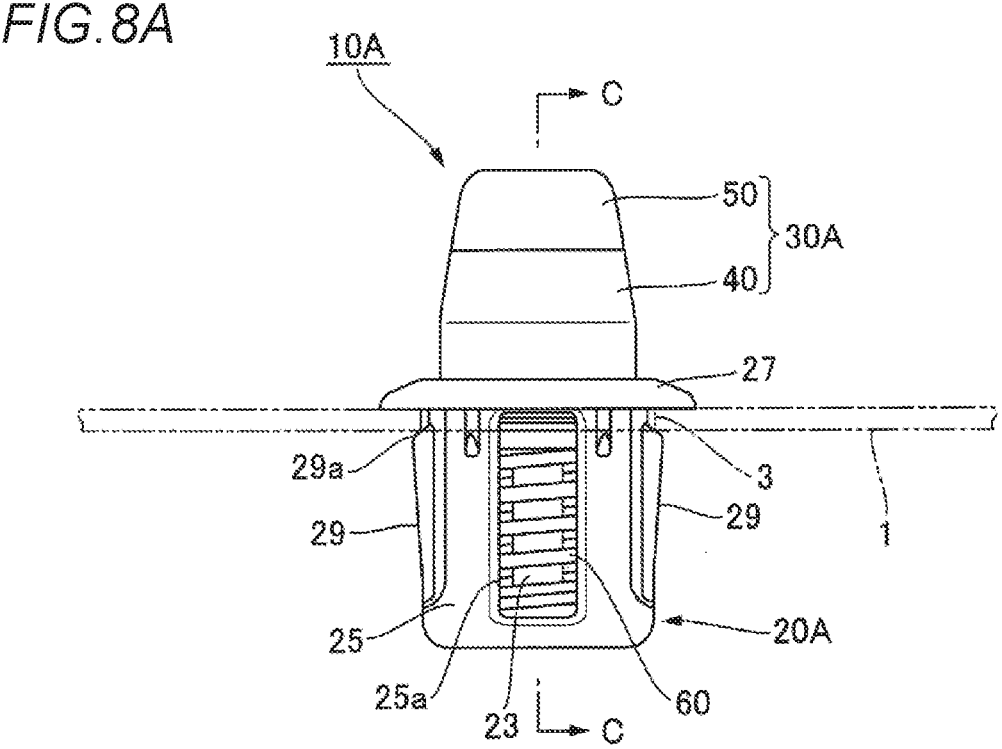
Figure 8B:
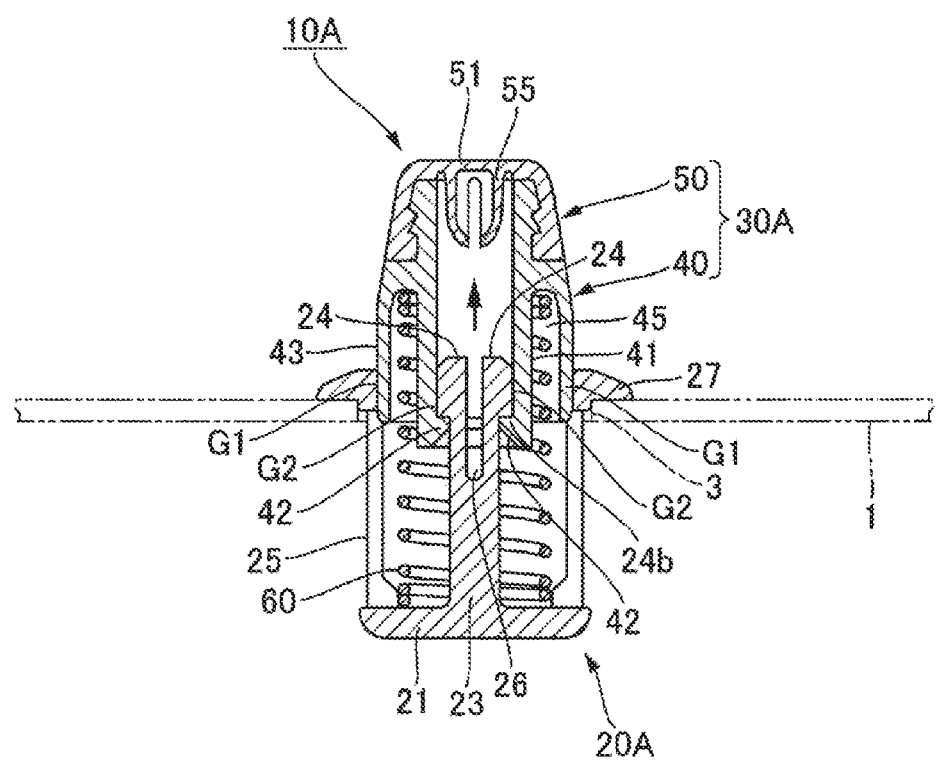

FIGS. 8A and 8B show another embodiment of a shock-absorbing device according to the invention. Like reference numerals to those given in the embodiment described above will be given to substantially like portions to those of the embodiment, and the description thereof will be omitted.

A shock-absorbing device 10A of this embodiment differs from the embodiment described above in construction of a retaining means.

Namely, as shown in FIG. 8B, a slit 26 is formed along an axial direction of a shaft portion 23 of a case member 20A at an axially distal end portion of the shaft portion 23, and a diametrically expanded portion 24 is divided into two portions via the slit 26 in such a way as to form a bifurcate configuration so that the diametrically expanded portion 24 can be deflected. On the other hand, an engaging projecting portion 42 configured to be brought into engagement with the diametrically expanded portion 24 is provided on an inner circumference of an axially proximal end portion of an inner cylinder 41 of a main body 40 of a shock-absorbing member 30A so as to project therefrom.

Consequently, when the shaft portion 23 of the case member 20A is aligned with the inner cylinder 41 of the shock-absorbing member 30A after a spring 60 is disposed in the case member 20A and the shock-absorbing member 30A is pushed into the case member 20A, the diametrically expanded portion 24 of the shaft portion 23 is pressed against by the engaging projecting portion 42 of the inner cylinder 41 to be deflected radially inwards. Then, when the engaging projecting portion 42 rides over the diametrically expanded portion 24, the diametrically expanded portion 24 is elastically restored, and the engaging projecting portion 42 is brought into engagement with a step portion 24b of the diametrically expanded portion 24, whereby the shock-absorbing member 30A can be mounted on the case member 20A while the shock-absorbing member 30A is prevented from being detached from the case member 20A (refer to FIG. 8B).

Figure 9A:
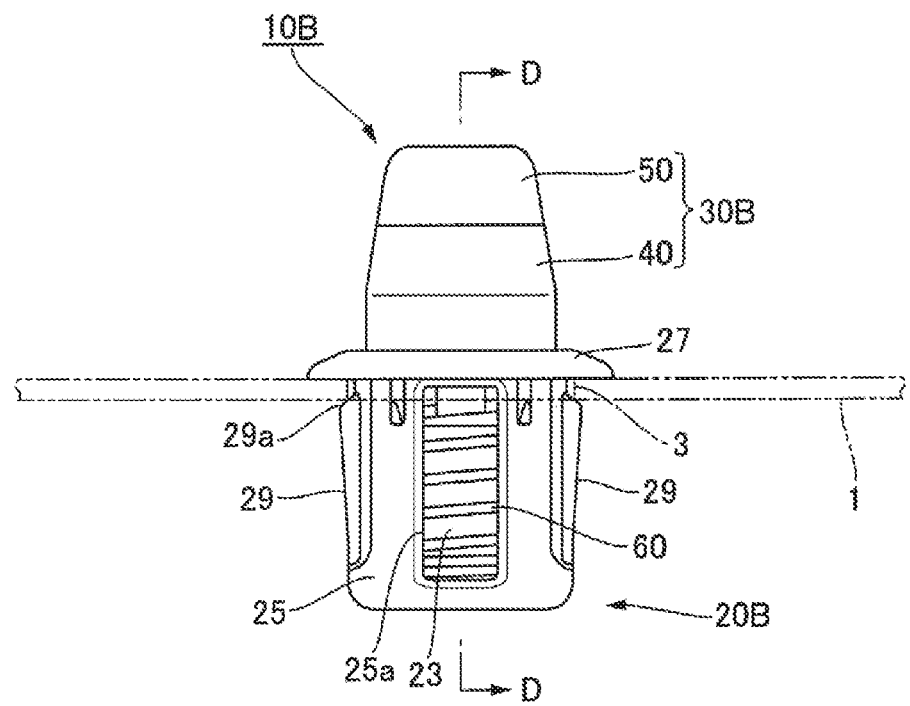
Figure 9B:
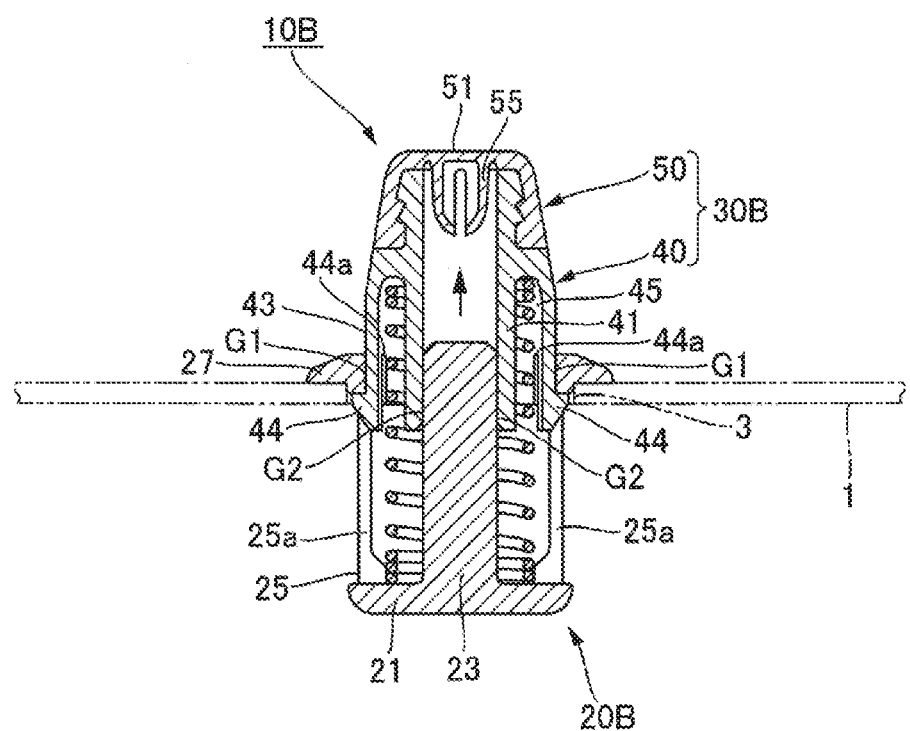

FIGS. 9A and 9B show a further embodiment of a shock-absorbing device according to the invention. Like reference numerals to those given in the embodiment described above will be given to substantially like portions to those of the embodiment, and the description thereof will be omitted.

A shock-absorbing device 10B of this embodiment differs from the embodiment described above in construction of a retaining means.

Namely, as shown in FIG. 9B, a shaft portion 23 of a case member 20B takes the form of a pillar having no diametrically expanded portion at a distal end portion thereof, and this shaft portion 23 is inserted slidably in an inner cylinder 41 of a shock-absorbing member 30B, the inner cylinder 41 having no projection on an inner diameter side thereof. Additionally, as shown in FIG. 9B, a plurality of slits 44a extending along an axial direction are formed in a circumferential direction at the other end portion of an outer cylinder 43 of the shock-absorbing member 30B, so that the other end portion side of the outer cylinder 43 can be deflected via the slits 44a. Further, engaging projecting portions 44, 44 are provided at circumferentially facing locations on an outer circumference of the other end portion of the outer cylinder 43 so as to project therefrom, so that the engaging projecting portions 44, 44 are brought into engagement with circumferential edge portions of cut-out portions 25a, 25a of the case member 20B which lie at a side of a flange 27.

Consequently, when a shaft portion 23 of the case member 20B is aligned with the inner cylinder 41 of the shock-absorbing member 30B after a spring 60 is disposed in the case member 20B and the shock-absorbing member 30B is pushed into the case member 20B, the shaft portion 23 is inserted into the inner cylinder 41, and the engaging projecting portions 44 are pressed against by an inner circumference of a circumferential wall 25 of the case member 20B, whereby the outer cylinder 43 is deflected radially inwards. Then, when the engaging projecting portions 44 reaches the cut-out portions 25a, the outer cylinder 43 is elastically restored, whereby the engaging projecting portions 44, 44 are brought into engagement with the corresponding circumferential edge portions of the cut-out portions 25a, 25a which lie at the side of the flange 27, allowing the shock-absorbing member 30B to be mounted on the case member 20B while being prevented from being detached from the case member 20B (refer to FIG. 9B).

Figure 10:
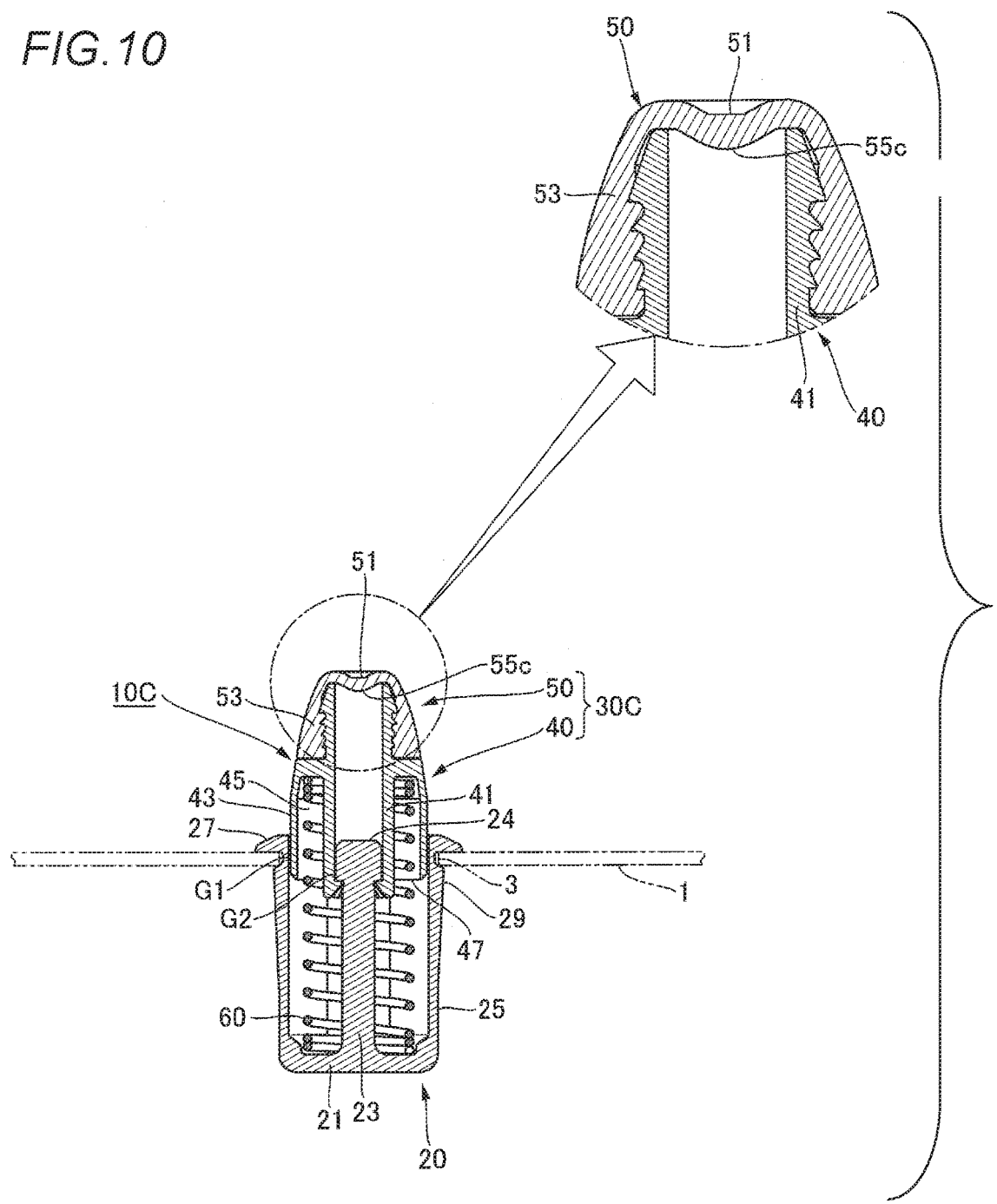
FIG. 10 shows a still further embodiment of a shock-absorbing device according to the invention and is a sectional view of a state in which the shock-absorbing device is mounted on a fixed member.
Figure 11A:
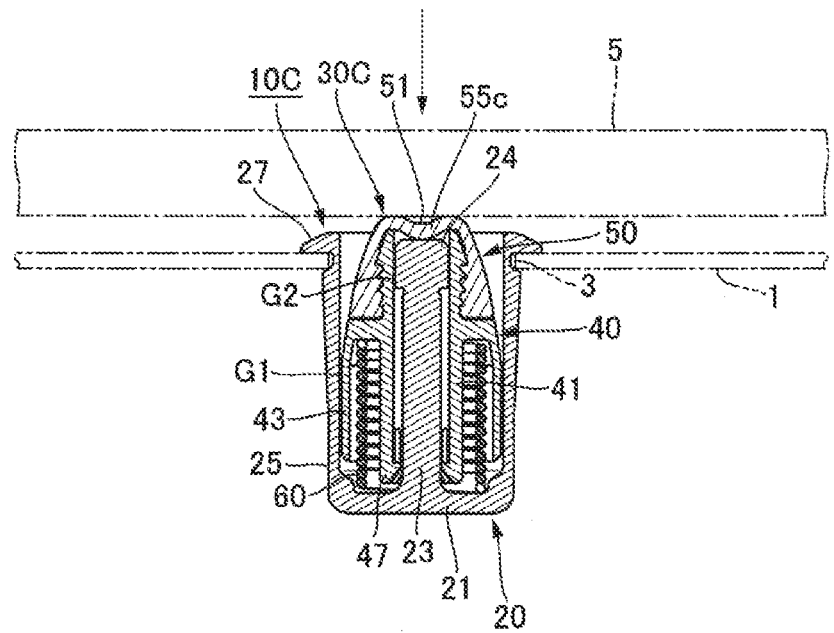
Figure 11B:
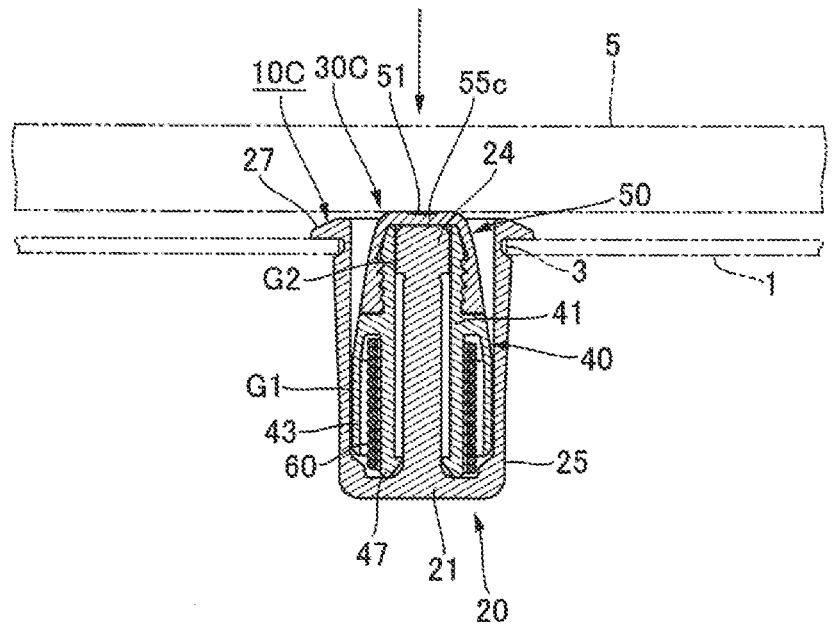

FIGS. 10, 11A and 11B show a still further embodiment of a shock-absorbing device according to the invention. Like reference numerals to those given in the embodiment described above will be given to substantially like portions to those of the embodiment, and the description thereof will be omitted.

A shock-absorbing device 10C of this embodiment differs from the embodiment described above in construction of a shock-absorbing member. Namely, a shock-absorbing member 30C of this embodiment differs from that of the embodiment described above in configuration of a projecting portion 55C which projects from an inner surface side of an abutment portion 51 of a cap 50 into an inner cylinder 41 of a main body 40. This projecting portion 51 is shaped in such a way that an outer surface of a central portion of the abutment portion 51 is depressed, while the projecting portion 55C projects from an inner surface of the central portion of the abutment portion 51 substantially into an angular configuration in which a top portion is made into a moderately curved surface and lower than the projecting portion 55 of the embodiment described first.

Then, the shock-absorbing member 30C is caused to slide away from a bottom portion 21 of a case member 20 due to a biasing force of a spring 60 (refer to FIG. 10). When the shock-absorbing member 30C is pressed against by a movable member 5 in this state, causing the shock-absorbing member 30C to slide towards the bottom portion 21 of the case member 20 against the biasing force of the spring 60, the projecting portion 55C is brought into elastic engagement with a diametrically expanded portion 24 at an axially distal end of a shaft portion 23 before the inner cylinder 41 and an outer cylinder 43 of the shock-absorbing member 30C are brought into abutment with the bottom portion 21 of the case member 20 (refer to FIG. 11A). When the shock-absorbing member 30C is pressed against further by the movable member 5, engaging claws 47 at a proximal end portion side of the inner cylinder 41 are brought into abutment with the bottom portion 21 of the case member 20, whereby any further movement of the movable member 5 is restricted. Additionally, the projecting portion 55C is pressed against by the axially distal end of the shaft portion 23, whereby the projecting portion 55C is elastically deformed so that the inner surface of the central portion of the abutment portion 51 becomes almost flat and that the depression on the outer surface side of the central portion of the abutment portion 51 is almost eliminated (refer to FIG. 11B). In this embodiment, too, similar to the embodiment described first, since the projecting portion 55C of the cap 50 is brought into elastic engagement with the distal end of the shaft portion 23 before the shock-absorbing member 30C is brought into abutment with the bottom portion 21 of the case member 20 against the elastic biasing force of the spring 60, striking noise generated when the movable member 5 collides with the shock-absorbing member 30C can be reduced.

It should be noted that the invention is not limited to the embodiments described above, and hence, various modifications can be made thereto without departing from the spirit and scope of the invention, and the resulting embodiments are also included in the spirit and scope of the invention.

DESCRIPTION OF REFERENCE NUMERALS AND CHARACTERS

Brief Description of Reference Numerals

1 Fixed Member
3 Mounting Hole
5 Movable Member
10, 10A, 10B, 10C Shock-Absorbing Device
20, 20A, 20B Case Member
21 Bottom Portion
23 Shaft Portion
24 Diametrically Expanded Portion
25 Circumferential Wall
29 Locking Portion
30, 30A, 30B, 30C Shock-Absorbing Member
40 Main Body
41 Inner Cylinder
43 Outer Cylinder
45 Cylindrical Space
47 Engaging Claw
50 Cap
55, 55c Projecting Portion
60 Spring
G1 First Guide
G2 Second Guide

The invention claimed is:

1. A shock-absorbing device disposed between a fixed member and a movable member which is configured to move towards and away from the fixed member, the shock-absorbing device being configured to suppress a movement of the movable member, the shock-absorbing device comprising:
a case member;
a shock-absorbing member mounted slidably on the case member and configured to be brought into abutment with the movable member or the fixed member to bear an impact; and
a spring configured to bias the shock-absorbing member in a direction away from the case member,
wherein the case member includes a bottom portion which supports one end of the spring, a shaft portion which projects from the bottom portion, and a circumferential wall disposed on an outer circumference of the shaft portion to receive the shock-absorbing member,
wherein the shock-absorbing member includes an inner cylinder into which the shaft portion of the case member is inserted, an outer cylinder disposed on an outer circumference of the inner cylinder, and a spring bearing portion configured to support the other end of the spring,
wherein a retaining member, configured to prevent the shock-absorbing member from being detached from the case member, is provided between the case member and the shock-absorbing member,
wherein an outer circumference of the outer cylinder of the shock-absorbing member is disposed in an inner circumference of the circumferential wall of the case member to function as a first guide for the shock-absorbing member when the shock-absorbing member slides, and an inner circumference of the inner cylinder of the shock-absorbing member is disposed on an outer circumference of the shaft portion of the case member to function as a second guide for the shock-absorbing member when the shock-absorbing member slides,
wherein the shock-absorbing member includes a main body including the inner cylinder and the outer cylinder and a cap formed of an elastic member and configured to be mounted on an outer circumference of a distal end portion of the main body, and wherein the inner cylinder has a shape protruding beyond the outer cylinder in an inserting direction of the shaft portion into the inner cylinder, and the cap includes an abutment portion which covers an opening on an projecting side end surface of the inner cylinder and has a disc-shape supported by a circumferential edge of the opening when the cap is mounted on the main body.

2. The shock-absorbing device according to claim 1, wherein the first guide and the second guide are disposed in positions where the first guide and the second guide overlap with each other in an axial direction when the case member is seen in a cross section taken along the axial direction.

3. The shock-absorbing device according to claim 1, wherein a cylindrical space is defined between the inner cylinder and the outer cylinder of the shock-absorbing member, and wherein the cylindrical space is disposed axially outwards of the case member in such a state that the shock-absorbing member slides in a direction away from the bottom portion of the case member, while the retaining member prevents the shock-absorbing member from being detached from the case member, and an axially outer end portion of the cylindrical space constitutes the spring bearing portion.

4. A shock-absorbing device disposed between a fixed member and a movable member which is configured to move towards and away from the fixed member, the shock-absorbing device being configured to suppress a movement of the movable member, the shock-absorbing device comprising:

a case member, a shock-absorbing member mounted slidably on the case member and configured to be brought into abutment with the movable member or the fixed member to bear an impact; and a spring configured to bias the shock-absorbing member in a direction away from the case member, wherein the case member includes a bottom portion which supports one end of the spring, a shaft portion which projects from the bottom portion, and a circumferential wall disposed on an outer circumference of the shaft portion to receive the shock-absorbing member, wherein the shock-absorbing member includes an inner cylinder into which the shaft portion of the case member is inserted, an outer cylinder disposed on an outer circumference of the inner cylinder, and a spring bearing portion configured to support the other end of the spring, wherein a retaining member, comprising a diametrically enlarged portion which is provided at a distal end portion of the shaft portion of the case member, and configured to prevent the shock-absorbing member from being detached from the case member, is provided between the case member and the shock-absorbing member, wherein an outer circumference of the outer cylinder of the shock-absorbing member is disposed in an inner circumference of the circumferential wall of the case member to function as a first guide for the shock-absorbing member when the shock-absorbing member slides, and an inner circumference of the inner cylinder of the shock-absorbing member is disposed on an outer circumference of the shaft portion of the case member to function as a second guide for the shock-absorbing member when the shock-absorbing member slides, and wherein the retaining member includes the diametrically enlarged portion that is diametrically enlarging the distal end portion and an engaging claw which is formed at a proximal end portion side of the inner cylinder of the shock-absorbing member so as to be deflected via a slit and is configured to be brought into engagement with the diametrically enlarged portion.

5. A shock-absorbing device disposed between a fixed member and a movable member which is configured to move towards and away from the fixed member, the shock-absorbing device being configured to suppress a movement of the movable member, the shock-absorbing device comprising:

a case member, a shock-absorbing member mounted slidably on the case member and configured to be brought into abutment with the movable member or the fixed member to bear an impact; and a spring configured to bias the shock-absorbing member in a direction away from the case member, wherein the case member includes a bottom portion which supports one end of the spring, a shaft portion which projects from the bottom portion, and a circumferential wall disposed on an outer circumference of the shaft portion to receive the shock-absorbing member, wherein the shock-absorbing member includes an inner cylinder into which the shaft portion of the case member is inserted, an outer cylinder disposed on an outer circumference of the inner cylinder, and a spring bearing portion configured to support the other end of the spring, wherein a retaining member, configured to prevent the shock-absorbing member from being detached from the case member, is provided between the case member and the shock-absorbing member, wherein an outer circumference of the outer cylinder of the shock-absorbing member is disposed in an inner circumference of the circumferential wall of the case member to function as a first guide for the shock-absorbing member when the shock-absorbing member slides, and an inner circumference of the inner cylinder of the shock-absorbing member is disposed on an outer circumference of the shaft portion of the case member to function as a second guide for the shock-absorbing member when the shock-absorbing member slides, wherein the shock-absorbing member includes a main body including the inner cylinder and the outer cylinder and a cap formed of an elastic member and configured to be mounted on an outer circumference of a distal end portion of the main body, wherein a projecting portion is provided so as to project from an inner surface side of the cap into the inner cylinder, and wherein the projecting portion of the cap is configured to be brought into abutment with the distal end portion of the shaft portion of the case member before the shock-absorbing member is pushed to slide against an elastic biasing force of the spring and the shock-absorbing member is brought into abutment with the bottom portion of the case member.

6. A shock-absorbing device disposed between a fixed member and a movable member which is configured to move towards and away from the fixed member, the shock-absorbing device being configured to suppress a movement of the movable member, the shock-absorbing device comprising:

a case member, a shock-absorbing member mounted slidably on the case member and configured to be brought into abutment with the movable member or the fixed member to bear an impact; and a spring configured to bias the shock-absorbing member in a direction away from the case member, wherein the case member includes a bottom portion which supports one end of the spring, a shaft portion which projects from the bottom portion, and a circumferential wall disposed on an outer circumference of the shaft portion to receive the shock-absorbing member, wherein the shock-absorbing member includes an inner cylinder into which the shaft portion of the case member is inserted, an outer cylinder disposed on an outer circumference of the inner cylinder, and a spring bearing portion configured to support the other end of the spring, wherein a retaining member, configured to prevent the shock-absorbing member from being detached from the case member, is provided between the case member and the shock-absorbing member, wherein an outer circumference of the outer cylinder of the shock-absorbing member is disposed in an inner circumference of the circumferential wall of the case member to function as a first guide for the shock-absorbing member when the shock-absorbing member slides, and an inner circumference of the inner cylinder of the shock-absorbing member is disposed on an outer circumference of the shaft portion of the case member to function as a second guide for the shock-absorbing member when the shock-absorbing member slides, and wherein, in the shock-absorbing member, the spring bearing portion is provided so as to project from the outer circumference of the inner cylinder at an axially halfway position and the outer cylinder extends via the spring bearing portion so as to be shorter than the inner cylinder in length.

* * * * *